(12) United States Patent
Hirai (10) Patent No.: US 9,143,644 B2
(45) Date of Patent: Sep. 22, 2015

(54) IMAGE FORMING APPARATUS

(71) Applicant: CANON KABUSHIKI KAISHA, Tokyo (JP)

(72) Inventor: Koji Hirai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/453,867

(22) Filed: Aug. 7, 2014

(65) Prior Publication Data

US 2015/0049370 A1    Feb. 19, 2015

(30) Foreign Application Priority Data

Aug. 15, 2013    (JP) ................... 2013-168864

(51) Int. Cl.
*H04N 1/04* (2006.01)
*H04N 1/00* (2006.01)

(52) U.S. Cl.
CPC ................. *H04N 1/00557* (2013.01)

(58) Field of Classification Search
CPC ............ H04N 17/004; H04N 1/00543; H04N 1/00554; H04N 1/00681; H04N 1/00748; H04N 1/00758; H04N 1/00774; H04N 1/00809; H04N 1/00816; H04N 1/00819; H04N 1/02815; H04N 2201/0006; H04N 5/2252
USPC ......... 358/1.13, 1.8, 400, 449, 474, 488, 494; 361/214, 278, 748, 752; 382/103, 139
See application file for complete search history.

(56) References Cited

U.S. PATENT DOCUMENTS

| | | | |
|---|---|---|---|
| 8,154,770 B2* | 4/2012 | Shiraki et al. ................. 358/401 |
| 8,422,917 B2* | 4/2013 | Shinkawa ..................... 399/200 |
| 8,536,513 B2* | 9/2013 | Baggs ............................ 250/234 |
| 2004/0027459 A1* | 2/2004 | Segawa et al. ........... 348/207.99 |
| 2008/0024836 A1* | 1/2008 | Sundnes ....................... 358/474 |
| 2009/0122330 A1* | 5/2009 | Andoh et al. ................ 358/1.13 |
| 2011/0041335 A1* | 2/2011 | Xie ............................. 29/890.1 |
| 2011/0043569 A1* | 2/2011 | Xie ............................... 347/44 |

FOREIGN PATENT DOCUMENTS

JP    2011-146150 A    7/2011

* cited by examiner

*Primary Examiner* — Neguessie Worku
(74) *Attorney, Agent, or Firm* — Fitzpatrick, Cella, Harper & Scinto (57) ABSTRACT

An image forming apparatus can suppress the degradation of an image signal due to electrostatic discharge with a simple configuration. An original feeder unit is supported openably and closably by a hinge mechanism fixed on a bottom member of an image reading unit. An image sensor substrate of an image reading unit and an image processing substrate of an image forming unit are connected by a cable. An electrically conductive connecting portion electrically connects a bottom member of the image reading unit with a casing of the image forming unit, and is arranged along the cable. The bottom member has a notch formed therein, the connecting portion is fixed to the bottom member so as to extend over the notch, and the cable is arranged so as to pass through an opening portion thereby formed in a direction from above to below of the bottom member.

12 Claims, 8 Drawing Sheets

IMAGE FORMING APPARATUS

BACKGROUND OF THE INVENTION

1. Field of the Invention

The present invention relates to an image forming apparatus which includes an image forming unit and an image reading unit that is arranged on the image forming unit and has an image reading portion therein.

2. Description of the Related Art

An ordinary image forming apparatus is provided with an image reading unit having therein an image reading portion which reads out an image formed on an original, and an image forming unit having therein an image forming portion which forms an image on a sheet, and has the image reading unit arranged on the image forming unit. The image reading portion includes a printed circuit board (image sensor substrate) having a photoelectric conversion element which exposes the original to light while scanning the original and thereby captures image information therein.

The image forming unit has an image processing portion which is arranged on a rear side of a casing and performs image processing. This image processing portion includes a printed circuit board (image processing substrate) that is a printed wiring board which has semiconductor devices such as a CPU mounted thereon.

The image reading portion and the image processing portion are connected by a cable, and the image processing portion acquires an image signal from the image reading portion through the cable. An original pressing plate for bringing an original into pressure contact with a platen is arranged on the image reading unit, and the original pressing plate can be freely opened and closed by a hinge mechanism.

In recent years, this original pressing plate is often incorporated in an original feeder unit which automatically feeds the original to the image reading unit. The hinge mechanism needs to freely open and close the original feeder unit which is a heavy article while supporting the original feeder unit and is, therefore, formed out of an electrically conductive member made of metal or the like.

Here, since an image signal (digital signal) is transmitted to the cable which connects the image reading portion to the image processing portion, it is required to suppress a radiation noise from the cable that is generated when the image signal is transmitted.

To suppress the radiation noise, the end of the lower part on the rear side of the electrically conductive casing of the image reading unit is connected to the end, opposite to the former end, of the upper part on the rear side of the electrically conductive casing of the image forming unit by an electrically conductive connecting member, and the cable is arranged on the connecting member. This connecting member functions as a path of a return current in response to a signal current passing through the cable. The radiation noise from the cable is suppressed by arranging the cable in the proximity of the connecting member.

However, the hinge mechanism is formed out of the electrically conductive member as described above and is a movable portion. For these reasons, it is difficult to cover the hinge mechanism wholly with an outer sheath such as a resin member, resulting in the exposure of the electrically conductive member. This causes electrostatic discharge (Electrostatic Discharge: ESD) to easily invade the casing of the image reading unit from the hinge mechanism.

The noise current caused by the ESD invading the casing of the image reading unit passes through the connecting member, and propagates through the casing of the image forming unit. At this time, the noise current propagates through the cable by electromagnetic coupling with the cable arranged in the vicinity of the connecting member, and may cause degradation of the image signal transmitted by the cable. Furthermore, in recent years, the transmission rate of transmitting this image signal becomes extremely high because of the accelerated image reading and image forming rates of the image forming apparatus and the improved definition of the image. As a result, the image signal is more susceptible to the noise such as the ESD.

To cope with these problems, Japanese Patent Application Laid-Open No. 2011-146150 proposes a method of making a cable less susceptible to noise such as ESD by shielding the cable.

However, the shielded cable described in Japanese Patent Application Laid-Open No. 2011-146150 has a problem of high cost.

Moreover, if the shielded cable is applied to the cable which connects the image reading portion to the image processing portion in the image forming apparatus, new problems occur. Specifically, the image reading portion needs to mechanically scan the original when reading out the original, and it is, therefore, required for the cable through which the image signal is transmitted to have a slidably flexing performance. In recent years, the image reading portion is thinner and the movable area of the cable which moves along with the scanning of the image reading portion is also limited, accordingly. Owing to this, the cable is required to have a higher slidably flexing performance. However, the shielded cable is disadvantageously unable to provide a sufficiently high slidably flexing performance since the shielded cable includes a shielding layer.

SUMMARY OF THE INVENTION

An object of the present invention is to provide an image forming apparatus which can suppress the degradation of an image signal originating in ESD, with a simple configuration.

According to an aspect of the present invention, an image forming apparatus comprises: an electrically conductive member; a platen disposed above the electrically conductive member; an image reading unit, disposed between the electrically conductive member and the platen, and having an image reading portion configured to scan an original placed on the platen, for reading out an original image; an image forming unit comprising an electrically conductive casing, an image processing portion connected to the image reading portion by a cable, to receive an image signal from the image reading portion by the cable and to process the image signal, and an image forming portion disposed inside of the electrically conductive casing, and forming an image, based on a result of the image processing by the image processing portion; an opening and closing member configured to open and close a surface of the platen; an electrically conductive hinge member fixed to the electrically conductive member, and being able to open and close the opening and closing member; and an electrically conductive connecting portion for an electrical continuity from the electrically conductive member to the electrically conductive casing, wherein the cable is passes through a first opening portion surrounded by the electrically conductive connecting portion and the electrically conductive member.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
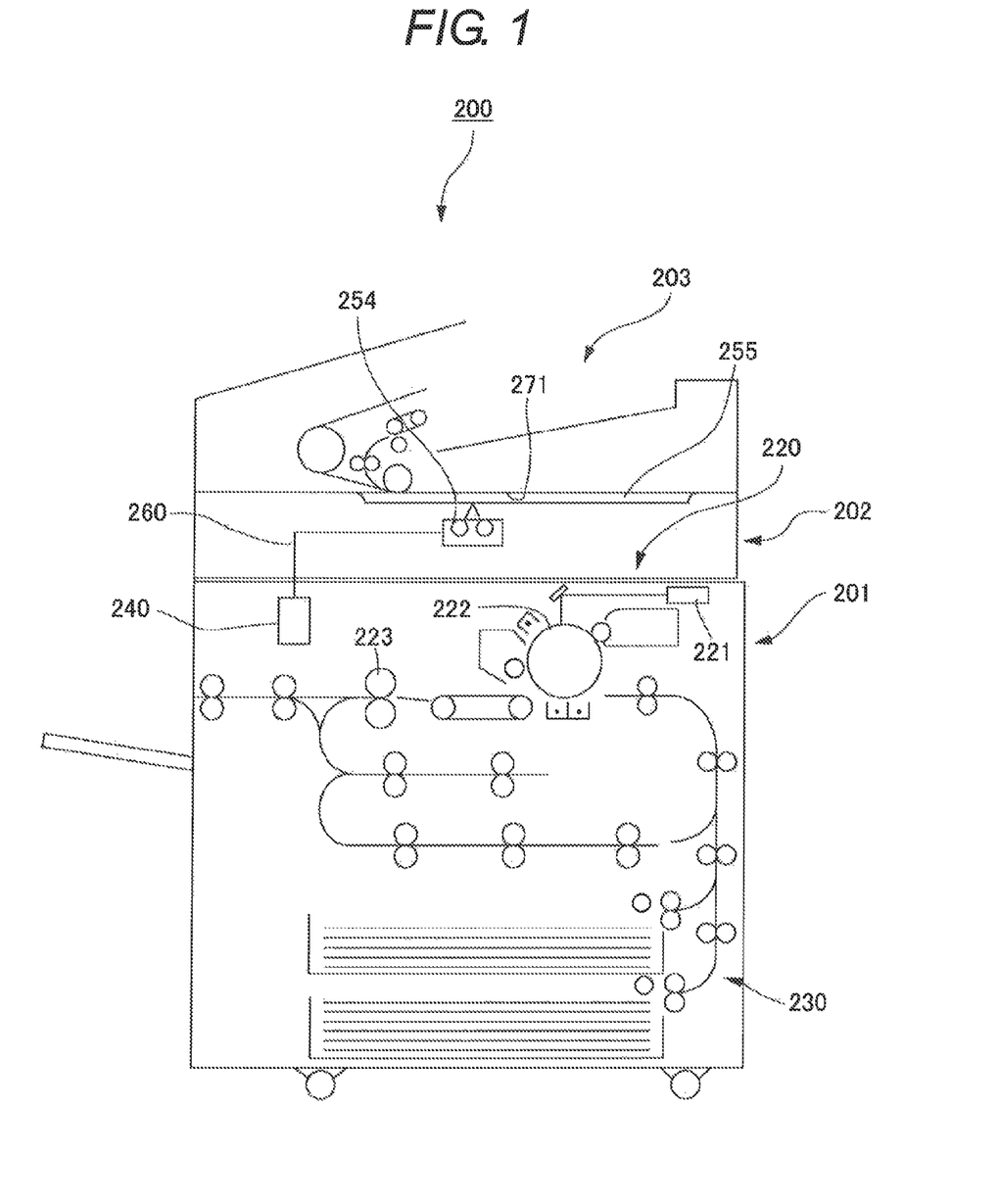
FIG. 1 is an explanatory view illustrating a schematic configuration of a copier as one example of an image forming apparatus according to a first embodiment.
Figure 2A:
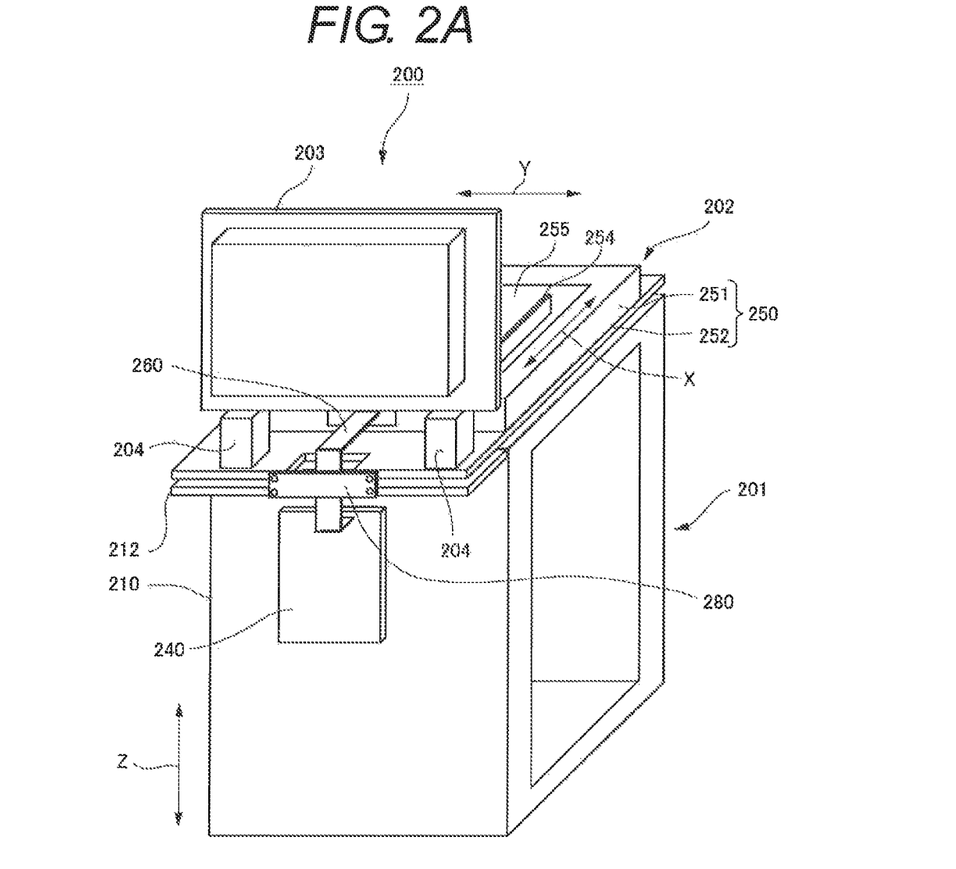
FIGS. 2A and 2B are perspective views of the copier as one example of the image forming apparatus according to the first embodiment, when the copier is viewed from the rear side.
Figure 2B:
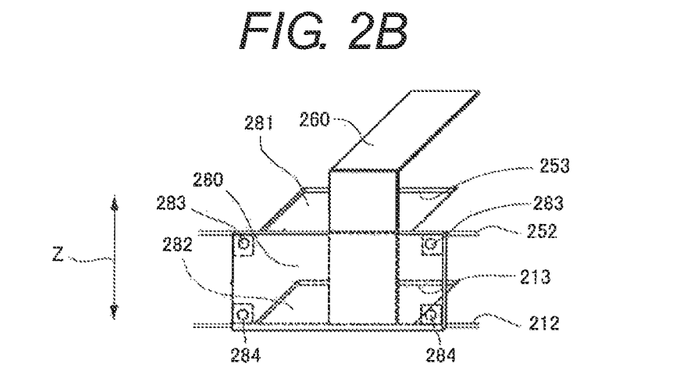

FIG. 1 is an explanatory view illustrating a schematic configuration of a copier as one example of an image forming apparatus according to a first embodiment. FIGS. 2A and 2B are perspective views illustrating the copier as one example of the image forming apparatus according to the first embodiment, when the copier is viewed from the rear side. FIG. 2A is a view illustrating the whole copier, and FIG. 2B is a partially enlarged view of the copier illustrated in FIG. 2A.

As is illustrated in FIG. 1, a copier 200 which functions as an image forming apparatus is provided with an image forming unit 201, and an image reading unit 202 which is disposed above the image forming unit 201. The copier 200 is also provided with an original feeder unit 203 which is disposed above the image reading unit 202 and functions as an opening and closing member, as is illustrated in FIG. 2A. Furthermore, the copier 200 is provided with a plurality of (two) hinge mechanisms 204 which support the original feeder unit 203 openably and closably with respect to the image reading unit 202. The image forming unit 201 supports the image reading unit 202, and the image reading unit 202 supports the original feeder unit 203 through the hinge mechanisms 204.

The image forming unit 201 includes an electrically conductive casing (for instance, made of metal) 210, as is illustrated in FIG. 2A; and has an image forming portion 220 which forms an image on a sheet (recording paper), and a sheet feeding portion 230 that feeds the sheet to the image forming portion 220, as is illustrated in FIG. 1. The image forming unit 201 also includes an image processing substrate 240 which functions as an image processing portion, as is illustrated in FIG. 1 and FIG. 2A. For information, the casing 210 can be grounded.

The casing 210 is formed into a generally rectangular parallelepiped shape. The image forming unit 201 includes a tabular electrically-conductive top member 212 which is fixed to the upper part of the casing 210 so as to project backward from the upper part of the casing 210 and extends in a horizontal direction. The upper face of the casing 210 is flush with the upper face of the top member 212. The image forming portion 220 and the sheet feeding portion 230 are disposed inside of the casing 210.

The image reading unit 202 includes an electrically conductive case (made of metal, for instance) 251 and an electrically conductive bottom member (made of metal, for instance) 252, which supports the case 251. These case 251 and bottom member 252 constitute a casing 250 of the image reading unit. The bottom member 252 is formed into a tabular shape extending in the horizontal direction, formed so as to have the same shape and the same area as those of the contour of the upper face of the casing 210 and the upper face of the top member 212 in a plan view, and fixed onto the casing 210 and the top member 212.

Furthermore, the image reading unit 202 is arranged on an opening portion on the upper face of the case, and has a platen glass 255 which functions as a platen supported by the case 251. Accordingly, the platen glass 255 is disposed above the bottom member 252 so as to be separated from the bottom member 252.

Moreover, the image reading unit 202 includes an image sensor substrate 254 which functions as an image reading portion that scans an original arranged on the platen glass 255 (on the platen) and reads out an original image. The image sensor substrate 254 is disposed between the bottom member 252 and the platen glass 255, i.e., inside of the case 251.

The image sensor substrate 254 includes a line sensor (photoelectric conversion element) (not shown) such as a CCD image sensor and a CMOS image sensor, which is formed so as to extend in an arrow X direction, and a light-emitting element (not shown). The image sensor substrate 254 moves in an arrow Y direction perpendicular to the arrow X direction by a moving mechanism (not shown), and thereby scans the original on the platen glass 255 in the arrow Y direction. The grounding terminal of the image sensor substrate 254 is arranged in a non-grounded state on the bottom member 252.

The image sensor substrate 254 and the image processing substrate 240 are electrically connected to each other by a cable 260 such as a flat cable. The image sensor substrate 254 performs the signal processing for generating an image signal for transmitting signals through the cable 260 on the basis of the captured image information. The image signal generated by the signal processing is transmitted to the image processing substrate 240 through the cable 260. The image processing substrate 240 performs image processing for image formation on the basis of the acquired image signal. The image processing substrate 240 controls a laser scanner 221 or the like of the image forming portion 220 illustrated in FIG. 1 to scan a photosensitive member 222 to form a latent image on the basis of a result of the image processing. A toner image developed on the photosensitive member 222 according to this latent image is transferred onto a sheet that is fed and conveyed, and fixed onto the sheet by passing through a fuser 223. Through the above operation performed by the image forming portion 220, the original image read out by the image sensor substrate 254 is formed on the sheet.

The original feeder unit 203 is an automatic document feeder (ADF) that feeds the original onto the platen glass 255, i.e., a position at which the image sensor substrate 254 can read out an image, and includes an original pressing plate 271 (FIG. 1) which faces the platen glass 255 at a closed position.

While the opening and closing member is described as the original feeder unit 203, there may be the case where the opening and closing member is configured as an original pressing plate that presses the original against the platen glass 255. In this case, the original feeder unit may be configured to be able to be optionally mounted in place of the original pressing plate.

The two hinge mechanisms 204 are fixed on the bottom member 252 of the image reading unit 202. More specifically, the two hinge mechanisms 204 are fixed on the end on the rear side of the bottom member 252 so as to be separated from each other. The hinge mechanism 204 is formed out of an electrically conductive member, i.e., metal, so as to openably and closably support the original feeder unit 203 which is a heavy article. Accordingly, the hinge mechanism 204 is electrically connected with the bottom member 252.

The original feeder unit 203 is supported openably and closably with respect to the platen glass 255, by these hinge mechanisms 204. When the original feeder unit 203 is in an opening position, the platen glass 255 is exposed to the outside, and a user can mount the original on the platen glass 255 or remove the original mounted on the platen glass 255. When the original feeder unit 203 is in the closed position, the original feeder unit 203 presses the original fed onto the platen glass 255 against the platen glass 255, and also prevents light emitted from the image sensor substrate 254 from leaking to the outside.

Here, the image processing substrate 240 is disposed outside of the casing 210, and surrounded by a box (not shown) which is disposed backside of the casing 210. The grounding terminal of the image processing substrate 240 is grounded to the casing 210 through the four corners which are connected to the casing 210.

The copier 200 is provided with an electrically conductive connecting portion 280 which electrically connects the bottom member 252 with the casing 210, and is arranged along the cable 260. This electrically conductive connecting portion 280 is arranged along the cable 260, and thereby works as a return current path for suppressing the radiation noise from the cable 260. The connecting portion 280 is formed into a tabular shape. The connecting portion 280 is connected to the bottom member 252 and the top member 212, and is electrically connected with the casing 210 through the top member 212.

As is illustrated in FIG. 2B, an opening portion 281 (first opening portion) through which the cable 260 passes in a direction from above to below (arrow Z direction) of the bottom member 252 is formed in a part more inward than the connecting portion 280. In addition, an opening portion 282 (second opening portion) through which the cable 260 passes in the direction from above to below (arrow Z direction) of the top member 212 is formed in a part more inward than the connecting portion 280. These opening portions 281 and 282 are formed on the end on the rear side of the bottom member 252 and on the end in the rear side of the top member 212, respectively. In addition, the opening portion 281 and the opening portion 282 are formed on such positions as to face each other.

In the first embodiment, the connecting portion 280 is a tabular electrically-conductive metal which is formed out of a member different from the bottom member 252 and the top member 212. In addition, a notch 253 through which the cable 260 passes in the direction from above to below is formed in the bottom member 252, and the upper ends of the connecting portion 280 are each fixed on the end face of the bottom member 252 so as to extend over the notch 253 by a fastener 283 such as a screw. The opening portion 281 is thereby formed between the bottom member 252 and the connecting portion 280.

In addition, a notch 213 through which the cable 260 passes in the direction from above to below is formed in the top member 212, and the lower ends of the connecting portion 280 are each fixed on the end face of the top member 212 so as to extend over the notch 213 by a fastener 284 such as a screw. The opening portion 282 is thereby formed between the top member 212 and the connecting portion 280.

The cable 260 which is connected to the image sensor substrate 254 is led out to the outside of the case 251 through the opening which is formed on the rear face of the case 251, and extends backward in a horizontal direction along the upper face of the bottom member 252. The cable 260 bends vertically from a horizontal state in the vicinity of the opening portion 281, and passes through the opening portions 281 and 282 in the direction from above to below (arrow z direction, i.e., vertical direction), and is connected to the image processing substrate 240.

Figure 8:
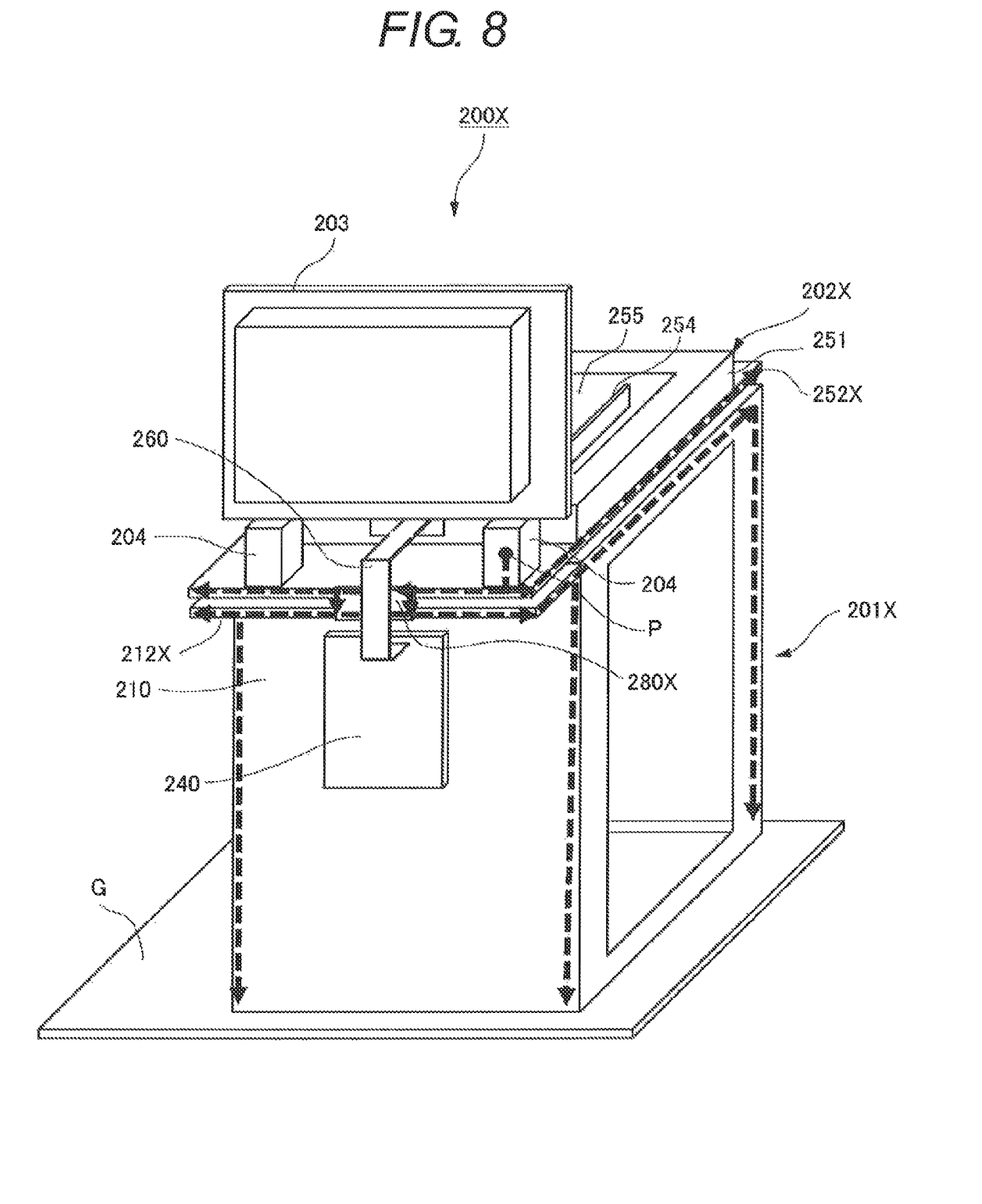
FIG. 8 is a perspective view of the copier of the comparative example, when the copier is viewed from the rear side.

Here, the copier of a comparative example of the case where the opening portion is not formed will be described below. FIG. 8 is a perspective view illustrating the copier of the comparative example. In a copier 200X of the comparative example illustrated in FIG. 8, configurations similar to those of the copier 200 of the first embodiment are designated by the same reference characters and numerals, and are not described herein.

The copier 200X is provided with an image forming unit 201X and an image reading unit 202X. The image forming unit 201X includes an electrically conductive top member 212X which is formed to be a tabular shape, and the image reading unit 202X includes an electrically conductive bottom member 252X which is formed to be a tabular shape. These top member 212X and bottom member 252X each do not have such a notch as in the first embodiment formed thereon. An electrically conductive connecting portion 280X which electrically connects the top member 212X with the bottom member 252X is arranged along the cable 260, but the cable 260 is arranged so as to pass through the outside of the connecting portion 280X. The casing 210 is installed on a ground plane G.

Next, in order to facilitate understanding of the phenomenon in the first embodiment, a path of the noise current caused by ESD will be described below, which flows in the copier 200X of the comparative example illustrated in FIG. 8, in the case where the ESD is applied to the hinge mechanism 204 on the right side of the image reading unit 202X. A basic phenomenon of a current path in the case where the ESD is applied to the hinge mechanism 204 on the left side of the image reading unit 202X is the same as that in the case where the ESD is applied to the hinge mechanism 204 on the right side, and is not, therefore, described herein. In FIG. 8, the path of the noise current (ESD current) caused by the ESD is shown by a dashed arrow.

The ESD applied to a point P of the hinge mechanism 204 on the right side of the image reading unit 202X propagates through the bottom member 252X with which the hinge mechanism 204 is electrically connected. Since the hinge mechanism 204 is arranged on the end of the bottom member 252X and the ESD current contains a high-frequency component, the ESD current has a property of propagating not through the inside of the conductor but through the edge of the conductor. Owing to this, the ESD current propagates through an edge of the rear side of the bottom member 252X on which the hinge mechanism 204 is arranged. The ESD current is branched into a horizontal edge and a vertical edge outside of the connecting portion 280X.

The ESD current which flows through the edge in the horizontal direction of the connecting portion 280X flows through the edge of the rear side of the bottom member 252X, subsequently. The ESD current which flows through the edge in the vertical direction of the connecting portion 280X flows through the edge on the rear side of the top member 212X of the image forming unit 201X, and through the connecting portion 280X. In the casing 210, the ESD current flows mainly through the corner portion in the vertical direction, and finally flows into a ground plane G as a displacement current, through capacitive coupling between the lowermost part of the casing 210 and the ground plane G. Since the cable 260 is arranged on such a position as to extend over the connecting portion 280X through which the ESD current strongly flows, the ESD current is electromagnetically coupled with the cable 260, and the noise current caused by the ESD is induced in the cable 260 and gives influence on the image signal.

Figure 3:
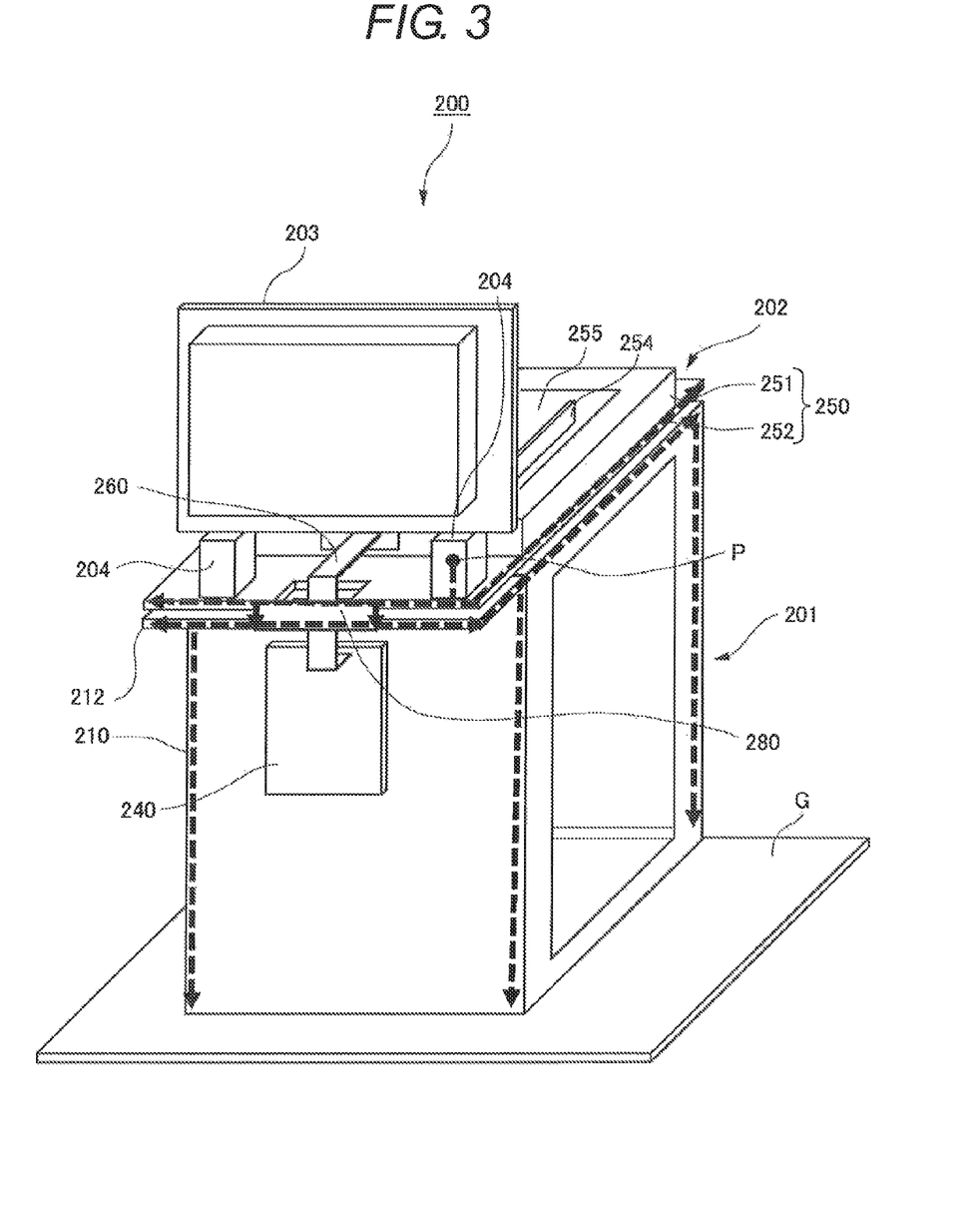
FIG. 3 is an explanatory view illustrating a path of an ESD current in the copier according to the first embodiment.
Figure 4:
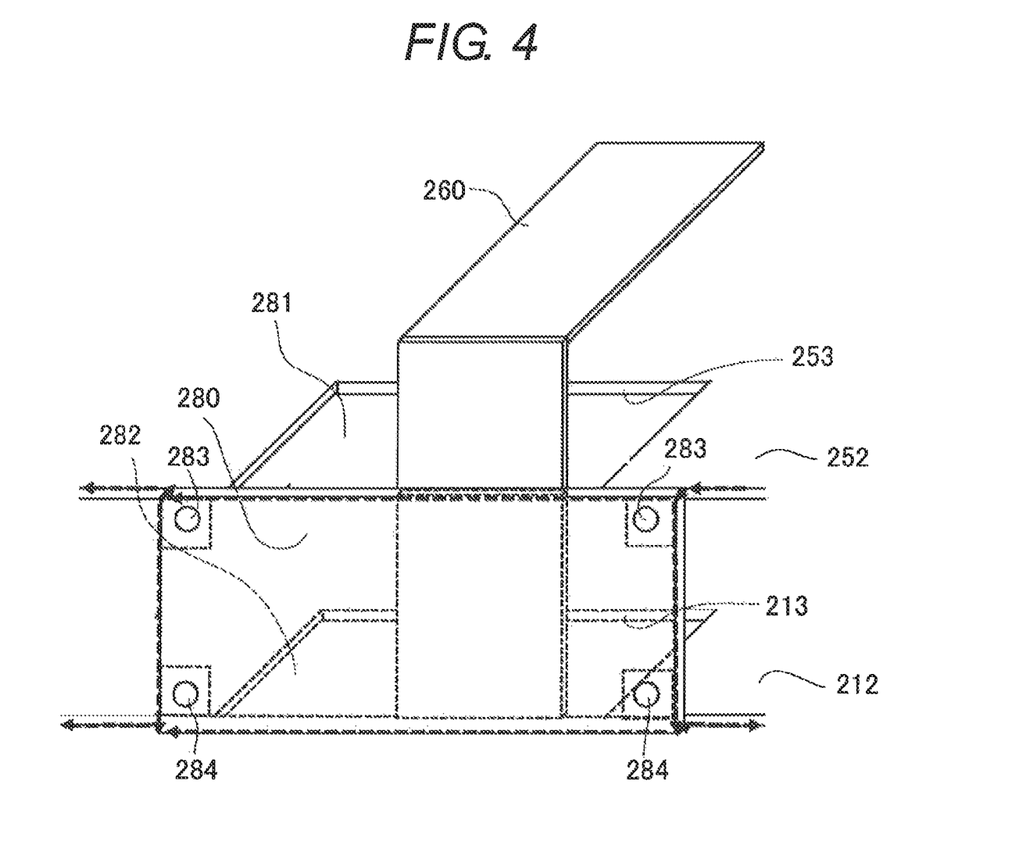
FIG. 4 is an explanatory view illustrating the path of the ESD current in an essential part of the copier of FIG. 3.

FIG. 3 is an explanatory view illustrating a path of an ESD current in the copier 200 according to the first embodiment. FIG. 4 is an explanatory view illustrating the path of the ESD current in an essential part of the copier 200 of FIG. 3. In FIG. 3 and FIG. 4, the path of the ESD current is shown by a dashed arrow.

As is illustrated in FIG. 3, the ESD current applied to the point P of the hinge mechanism 204 on the right side basically flows through a path which is approximately similar to the path in the copier 200X of the comparative example illustrated in FIG. 8.

Here, the ESD current has the property of flowing through edges of a conductor. Accordingly, as is illustrated in FIG. 4, the ESD current flowing through the edge of the bottom member 252 mostly flows toward the edge of the outside of the connecting portion 280, and hardly flows through the edge of the notch 253 and the edge of the inside of the connecting portion 280 (i.e., edge of opening portion 281). A similar phenomenon occurs also in the notch 213 of the top member 212, and the ESD current does not almost flow through the edge of the notch 213 and the edge inside of the connecting portion 280 (i.e., edge of opening portion 282).

The ESD current strongly flows also through the edge in the vertical direction of the connecting portion 280, and accordingly, in order to suppress the electromagnetic coupling between the ESD current passing through the edge in the vertical direction of the connecting portion 280 and the cable 260, the width in the horizontal direction of the connecting portion 280 is preferably larger than the width of the cable 260.

As described above, according to the first embodiment, the ESD current decreases in the edge of the opening portions 281 and 282 formed inside of the connecting portion 280 through which the cable 260 passes, compared to that in the edge of the outside of the connecting portion 280. The cable 260 can be thereby separated from the path through which the ESD current flows. Therefore, the induction of the noise into the cable 260 by the electromagnetic coupling is suppressed, and the degradation of the image signal which propagates through the cable 260 can be suppressed with a simple structure.

Furthermore, since the connecting portion 280 is formed out of a member different from the bottom member 252 and the top member 212, the connecting portion 280 can be removed by fasteners 283 and 284 such as a screw. Accordingly, the cable 260 can be easily connected to the substrates 240 and 254 in an assembly process, and can be easily attached to or detached from the substrates 240 and 254 in a maintenance operation.

Moreover, the opening portions 281 and 282 through which the cable 260 passes are formed by the notches 253 and 213. Therefore, the portion is reduced which projects to the backside of the bottom member 252 and the top member 212, and the whole apparatus can be compactly manufactured.

While the case has been described where the opening portions 281 and 282 are formed by the connecting portion 280 that is formed of a member separate from the bottom member 252 and the top member 212, and the notches 253 and 213 of the bottom member 252 and the top member 212, respectively, the opening portions are not limited to the case.

If the connecting portion 280 is formed integrally with the bottom member 252, a through hole which is adjacent to the connecting portion 280 may be formed in the bottom member 252, as the opening portion 281. The connecting portion 280 may be formed so as to be bent with respect to the bottom member 252.

Similarly, if the connecting portion 280 is formed integrally with the top member 212, a through hole which is adjacent to the connecting portion 280 may be formed in the top member 212, as the opening portion 282. The connecting portion 280 may be formed so as to be bent with respect to the top member 212.

In addition, the case has been described where the connecting portion 280 is fixed to the bottom member 252 and the top member 212 by the fasteners 283 and 284 such as the screw, but the fixing method is not limited to the case. Any fixing method may be used as long as the connecting portion 280 is electrically connected with the bottom member 252 and the top member 212.

Moreover, it is also acceptable to bend the connecting portion 280 so that the central portion in the width direction of the connecting portion 280 is separated from the bottom member 252, without forming the notch 253 in the bottom member 252, and to form a first opening portion (space) between the bottom member 252 and the connecting portion 280. Similarly, it is also acceptable to bend the connecting portion 280 so that the central portion in the width direction of the connecting portion 280 is separated from the top member 212, without forming the notch 213 in the top member 212, and to form a second opening portion (space) between the top member 212 and the connecting portion 280.

In the first embodiment, the noise current discharged to the bottom member of the image reading unit propagates through the edge of the bottom member of the image reading unit, propagates through the edge of the outside of the connecting portion, and flows into the casing of the image forming unit. Accordingly, the noise current decreases in the edge of the opening portion formed inside of the connecting portion, through which the cable passes, compared to that in the edge outside of the connecting portion. The cable can be thereby separated from the path through which the noise current flows, accordingly the induction of the noise into the cable by the electromagnetic coupling is suppressed, and the degradation of the image signal which propagates through the cable can be suppressed with a simple structure.

Example 1

In order to confirm the above described functions and effects, a result of an electromagnetic field simulation calculation conducted to the shapes of the copier 200 of the first embodiment and the copier 200X of the comparative example will be described below.

The end on the rear side of the top member 212 faces the end in the rear side of the bottom member 252, on a plane 5 mm below the bottom member 252, and is aligned with the end on the rear side of the bottom member 252. The cable 260 was a flat cable and did not come in contact with the edges of the notches 253 and 213 and with the connecting portion 280. The notches 253 and 213 both had lengths of 60 mm in a transverse direction of the copier and 23 mm in a depth direction thereof. The gaps in the depth direction between the cable 260 and each of the notches 253 and 213 were set both at 11 mm, and the gap in the depth direction between the cable 260 and the connecting portion 280 was set at 11 mm.

As for the cable 260, the number of conductor lines was set at 3; and one conductor line in the center was a signal line, and lines on both sides of the signal line were a ground line. The signal line was terminated on the image sensor substrate 254 at a resistance of 10Ω, which was assumed to be a driver IC, and was terminated on the image processing substrate 240 at a resistance of 1 MΩ, which was assumed to be a receiver IC. The ground lines were connected to the grounds of the respective substrates. The lowermost part of the image forming unit 201 was arranged at a position 80 mm higher than the ground plane G.

Figure 5:
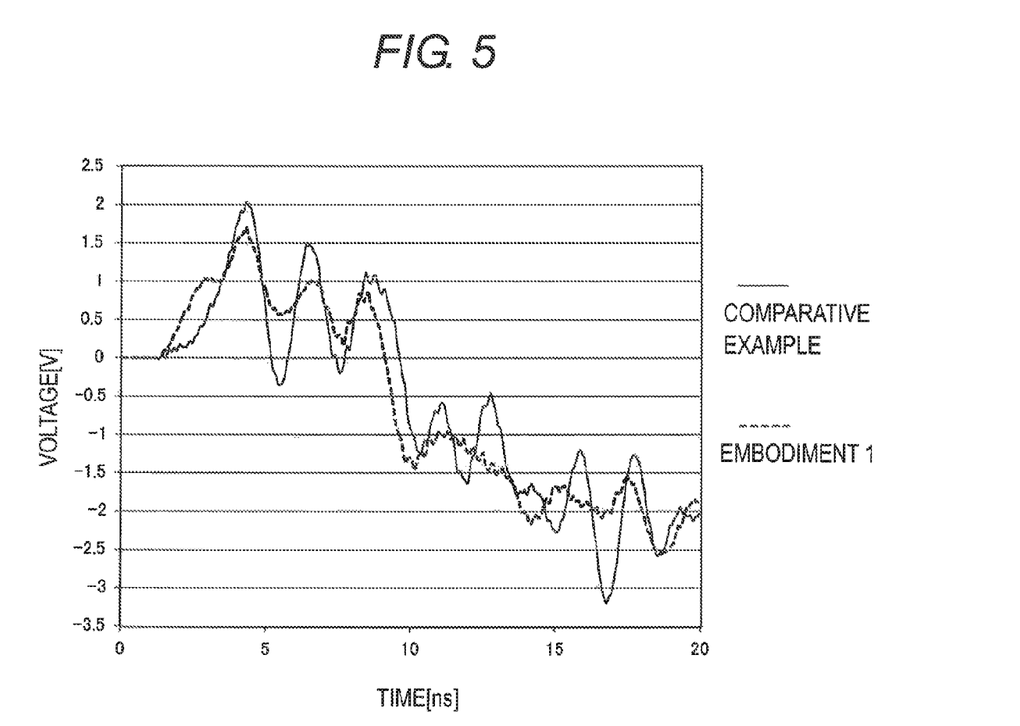
FIG. 5 is a graph illustrating values of voltages varying with elapsed time, which are induced in image processing substrates through cables, when the ESD is applied to the copier of the first embodiment and a copier of a comparative example.

Here, a result of calculating voltages is illustrated in FIG. 5, which appear in a termination resistance of 1 MΩ on the side of the image processing substrate 240, in the case where an initial value of the electrostatic charge of ESD was set at 10 kV and the ESD was applied to the point P on the hinge mechanism 204 on the right side. In the graph illustrated in FIG. 5, a horizontal axis represents elapsed time, and a vertical axis represents a voltage value. For comparison, a calculation result for the copier 200X of the comparative example is also illustrated together. Here, a distance between the connecting portion 280X and the cable 260 of the comparative example was also set at 11 mm. It can be understood from the calculation result that the peaks of the envelope of the voltages induced by the ESD can be more reduced in the copier 200 of the first embodiment than in the copier 200X of the comparative example.

Second Embodiment

Figure 6:
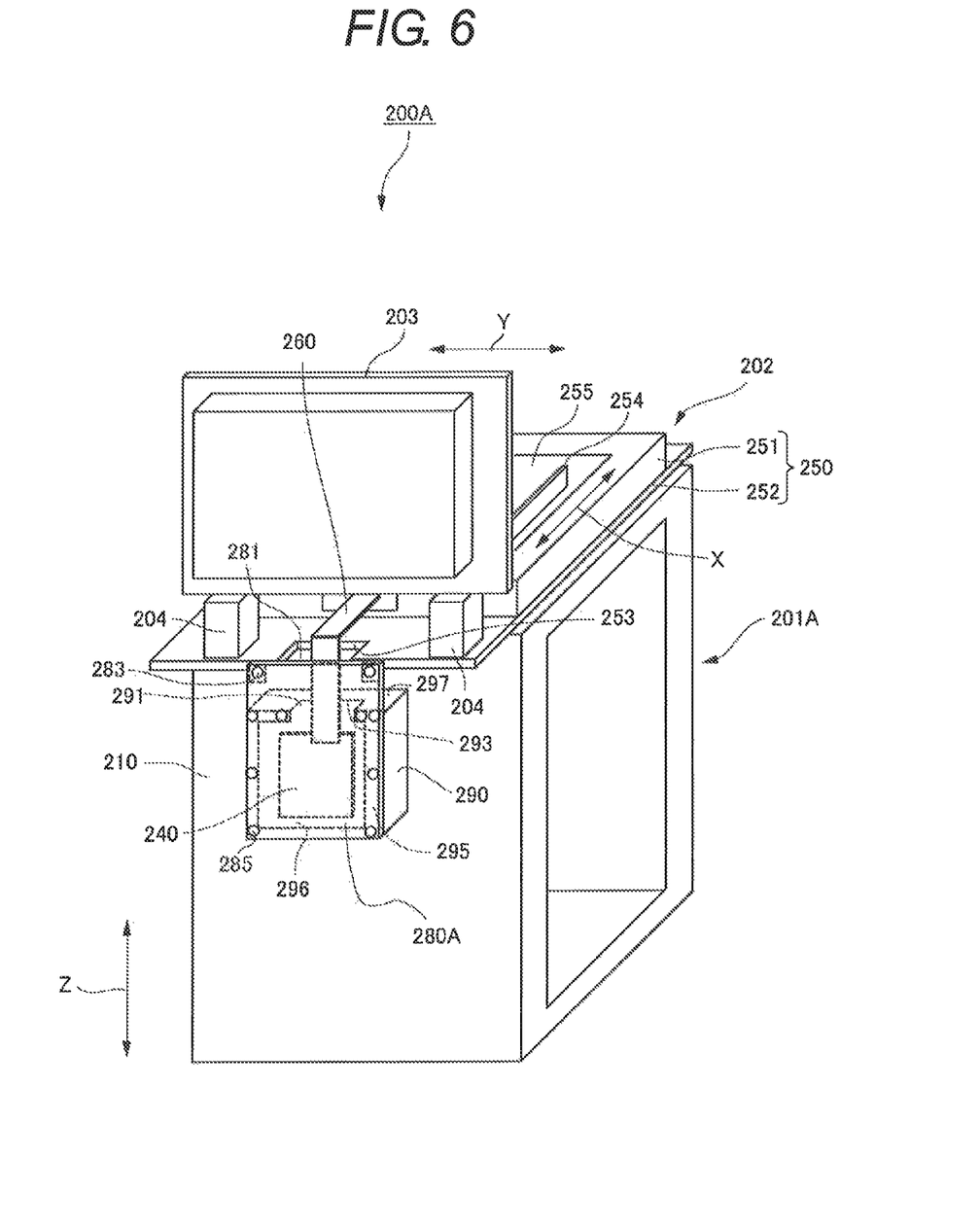
FIG. 6 is an explanatory view illustrating a schematic configuration of a copier as one example of an image forming apparatus according to a second embodiment.

Next, an image forming apparatus according to a second embodiment of the present invention will be described below. FIG. 6 is an explanatory view illustrating a schematic configuration of a copier as one example of the image forming apparatus according to the second embodiment. Note that FIG. 6 is a perspective view illustrating the copier viewed from the rear side, as one example of the image forming apparatus according to the second embodiment. In the second embodiment, configurations similar to those in the above described first embodiment are designated by the same reference characters and numerals, and are not described herein.

The copier 200A includes an image forming unit 201A as well as the image reading unit 202, the original feeder unit 203 and the plurality (two, for instance) of hinge mechanisms 204, which have the similar configurations to those in the above described first embodiment.

The image forming unit 201A includes the casing 210, the image forming portion 220 (see FIG. 1), the sheet feeding portion 230 (see FIG. 1), and the image processing substrate 240 which functions as the image processing portion, similarly to the above described first embodiment. The image sensor substrate 254 of the image reading unit 202 and the image processing substrate 240 are electrically connected to each other by the cable 260.

In the second embodiment, the copier 200A includes an electrically conductive box 290 which has the image processing substrate 240 arranged in its inner part and is fixed to a side part (specifically, side part on rear side) of the casing 210. The copier 200A also includes a connecting portion 280A which is connected with the box 290 and is electrically connected with the casing 210 through the box 290.

The connecting portion 280A is arranged along the cable 260 and connected to the bottom member 252. The connecting portion 280A thereby electrically connects the bottom member 252 with the casing 210. This electrically conductive connecting portion 280A is arranged along the cable 260, and thereby works as a return current path for suppressing the radiation noise to be sent from the cable 260. The connecting portion 280A forms an opening portion 291 that serves as a third opening portion through which the cable 260 passes in a direction from above to below (arrow Z direction) of the box 290.

The connecting portion 280A is formed into a tabular shape by a member different from the box 290. An opening 296 which is blocked by the connecting portion 280A is formed on a side surface (specifically, face in rear direction of copier) 295 of the box 290. That is, the connecting portion 280A also serves as a cover of the box 290, and extends from the notch 253 of the bottom member 252 downward to the lower end portion of the box 290 so as to cover the opening 296. In addition, a notch 293 which communicates with the opening 296 and allows the cable 260 to pass therethrough is formed on an upper face 297 of the box 290.

The upper end of the connecting portion 280A is fixed onto the end face of the bottom member 252 so as to extend over the notch 253 by a fastener 283 such as a screw. The opening portion 281 is thereby formed between the bottom member 252 and the connecting portion 280.

A middle portion of the connecting portion 280A is also fixed on the side surface 295 of the box 290 so as to extend over the notch 293 and block the opening 296 of the box 290 in a portion between the middle portion and the lower end portion of the connecting portion 280A, by a fastener 285 such as a screw. The opening portion 291 is thereby formed in the upper face 297 of the box 290.

As described above, in the second embodiment, the ESD current decreases in edges of the opening portions 281 and 291 formed inside of the connecting portion 280A, through which the cable 260 passes, compared to that in the edge outside of the connecting portion 280A. The cable 260 can be thereby separated from the path through which the ESD current flows. Therefore, the induction of the noise into the cable 260 by the electromagnetic coupling is suppressed, and the degradation of the image signal which propagates through the cable 260 can be suppressed, with a simple structure.

Furthermore, since the connecting portion 280A is formed out of a member different from the bottom member 252 and the box 290, the connecting portion 280A can be removed by fasteners 283 and 285 such as a screw. Accordingly, the cable 260 can be easily connected to the substrates 240 and 254 in an assembly process, and can be easily attached to and detached from the substrates 240 and 254 in a maintenance operation.

Moreover, since the opening portions 281 and 291 through which the cable 260 passes are formed by the notches 253 and 293, the portion is reduced which projects to the backside of the bottom member 252 and the box 290, and the whole apparatus can be compactly manufactured.

Furthermore, since the connecting portion 280A serves also as the cover of the box 290, the cost can be reduced because of the reduction of the member and the mold, and assembly properties can be enhanced.

While the case has been described where the opening portions 281 and 291 are formed by the connecting portion 280A that is formed of a member separate from the bottom member 252 and the box 290, and the notches 253 and 293 of the bottom member 252 and the box 290, respectively, the opening portions are not limited to the case.

If the connecting portion 280A is formed integrally with the bottom member 252, a through hole adjacent to the connecting portion 280A may be formed in the bottom member 252 as the opening portion 281. The connecting portion 280A may be formed so as to be bent with respect to the bottom member 252.

Similarly, if the connecting portion 280A is formed integrally with the box 290, a through hole which is adjacent to the connecting portion 280A may be formed in the box 290 as the opening portion 291. The connecting portion 280A may be formed so as to be bent with respect to the box 290.

Furthermore, while the case has been described where the connecting portion 280A is fixed to the bottom member 252 and the box 290 by the fasteners 283 and 285 such as the screw, the fixing method is not limited to the case. Any fixing method may be used as long as the connecting portion 280A is electrically connected with the bottom member 252 and the box 290.

Moreover, it is also acceptable to bend the connecting portion 280A so that the central portion in the width direction of the connecting portion 280A is separated from the bottom member 252, without forming the notch 253 in the bottom member 252, and to form a first opening portion (space) between the bottom member 252 and the connecting portion 280A. Similarly, it is also acceptable to bend the connecting portion 280A so that the central portion in the width direction of the connecting portion 280A is separated from the box 290 without forming the notch 293 in the box 290, and to form a third opening portion (space) between the box 290 and the connecting portion 280A.

Third Embodiment

Figure 7A:
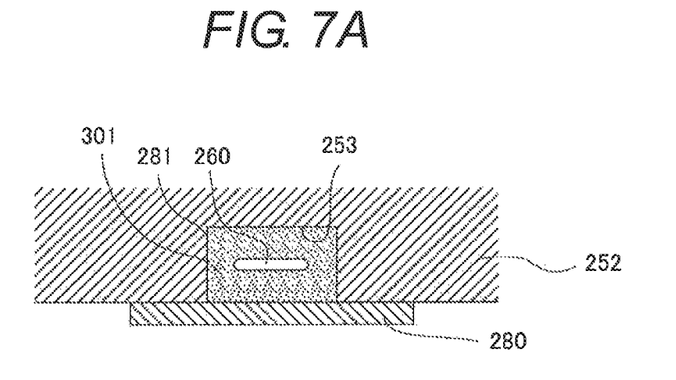
FIGS. 7A, 7B and 7C are cross-sectional views of essential parts of a copier as one example of an image forming apparatus according to a third embodiment.
Figure 7B:
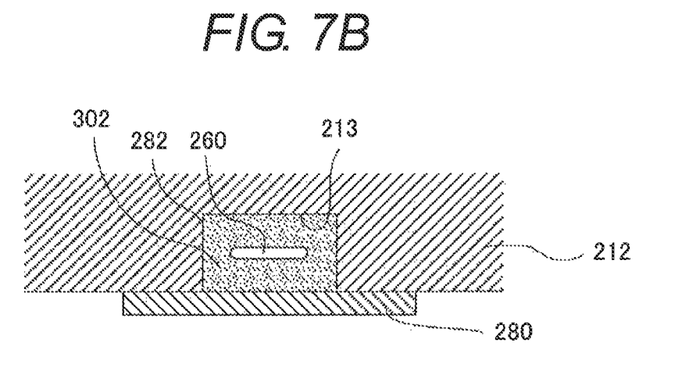
Figure 7C:
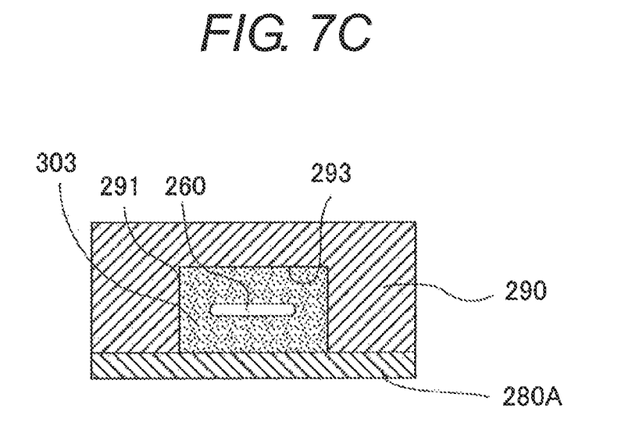

Next, an image forming apparatus according to a third embodiment of the present invention will be described below. FIGS. 7A to 7C are cross-sectional views of essential parts of a copier as one example of the image forming apparatus according to the third embodiment. FIG. 7A is a cross-sectional view in the vicinity of a notch of a bottom member, FIG. 7B is a cross-sectional view in the vicinity of a notch of a top member, and FIG. 7C is a cross-sectional view in the vicinity of a notch of a box. In the third embodiment, configurations similar to those in the above described first embodiment and second embodiment are designated by the same reference characters and numerals, and not described herein.

As is illustrated in FIG. 7A, the copier includes an insulating member 301 which serves as a first insulating member for holding an opening portion 281 that is a first opening portion, and a cable 260 separately from each other. The insulating member 301 is formed out of an electric insulator of resin or the like, for instance.

As is illustrated in FIG. 7B, the copier includes an insulating member 302 which serves as a second insulating member for holding an opening portion 282 that is a second opening portion, and the cable 260 separately from each other. The insulating member 302 is formed out of an electric insulator such as resin.

As is illustrated in FIG. 7C, the copier includes an insulating member 303 which serves as a third insulating member for holding an opening portion 291 that is a third opening portion, and the cable 260 separately from each other. The insulating member 303 is formed out of an electric insulator such as resin.

With the above configuration, the contact of the cable 260 with the opening portions 281, 282 and 291 is avoided by the insulating members 301, 302 and 303, even though positions of the cable 260 varies in an assembly process. The degradation of an image signal which propagates through the cable 260 can be thereby more effectively suppressed.

The present invention is not limited to the embodiments described above, and can be variously modified within a technical idea of the present invention by those who have an ordinary skill in the art.

In the second embodiment, the case has been described where the top member 212 is not connected to the casing 210. However, the present invention is also applicable to the case where the top member 212 is connected to the casing 210 in the second embodiment. In this case, the second opening portion may be formed so as to be adjacent to the connecting portion.

Furthermore, in the first to third embodiments, the case has been described where the image forming apparatus is the copier; however, the image forming apparatus is not limited to the copier. The present invention is even applicable to, for example, a facsimile or a multifunction machine that functions as a copier and a facsimile.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-168864, filed Aug. 15, 2013, which is hereby incorporated by reference herein in its entirety.

What is claimed is:
1. An image forming apparatus comprising:
an electrically conductive member;
a platen disposed above the electrically conductive member;
an image reading unit, disposed between the electrically conductive member and the platen, and having an image reading portion configured to scan an original placed on the platen, for reading out an original image;
an image forming unit comprising:
an electrically conductive casing,
an image processing portion connected to the image reading portion by a cable, to receive an image signal from the image reading portion by the cable and to process the image signal, and
an image forming portion disposed inside of the electrically conductive casing, and forming an image, based on a result of the image processing by the image processing portion;
an opening and closing member configured to open and close a surface of the platen;
an electrically conductive hinge member fixed to the electrically conductive member, and facilitating opening and closing of the opening and closing member; and
an electrically conductive connecting portion for causing electrical continuity from the electrically conductive member to the electrically conductive casing, wherein the cable passes through an opening portion surrounded by the electrically conductive connecting portion and the electrically conductive member.

2. The image forming apparatus according to claim 1, wherein
the opening and closing member comprises an original feeder unit for feeding the original to the platen.

3. The image forming apparatus according to claim 1, wherein
the electrically conductive connecting portion is formed by a member separate from the electrically conductive member,
the electrically conductive member has a notch formed to pass therethrough the cable, and
the opening portion is formed, such that the electrically conductive connecting portion is extended over the notch of the electrically conductive member to be fixed to the electrically conductive member.

4. The image forming apparatus according to claim 1, further comprising
an insulating member holding the opening portion and the cable separately from each other.

5. The image forming apparatus according to claim 1, further comprising
an electrically conductive top member connected to an upper portion of the electrically conductive casing, wherein
the electrically conductive connecting portion is connected to the electrically conductive top member, and connected electrically through the electrically conductive top member to the electrically conductive casing.

6. The image forming apparatus according to claim 5, wherein
the electrically conductive connecting portion has a second opening portion formed to pass therethrough the cable in a direction from above the electrically conductive top member to below the electrically conductive top member.

7. The image forming apparatus according to claim 6, wherein
the electrically conductive connecting portion is formed from a member separate from the electrically conductive top member,
the electrically conductive top member has a notch formed to pass therethrough the cable, and
the second opening portion is formed, such that the electrically conductive connecting portion is extended over the notch of the electrically conductive top member to be fixed to the electrically conductive top member.

8. The image forming apparatus according to claim 6, further comprising
an insulating member holding the second opening portion and the cable separately from each other.

9. The image forming apparatus according to claim 1, further comprising
an electrically conductive box, in which the image processing portion is arranged, fixed to a side portion of the electrically conductive casing, wherein
the electrically conductive connecting portion is connected to the electrically conductive box and has electrical continuity through the electrically conductive box to the electrically conductive casing.

10. The image forming apparatus according to claim 9, wherein
the electrically conductive connecting portion has a second opening portion formed to pass therethrough the cable in a direction from above the electrically conductive box to below the electrically conductive box.

11. The image forming apparatus according to claim 10, wherein
the electrically conductive connecting portion is formed from a member separate from the electrically conductive box,
the electrically conductive box has an opening at a side surface thereof formed to be covered by the electrically conductive connecting portion,
the electrically conductive box has, at an upper surface thereof, a notch formed to be communicated with the opening and to pass therethrough the cable,
the electrically conductive connecting portion is fixed to the side surface of the electrically conductive box, and
the second opening portion is formed in the upper surface of the electrically conductive box.

12. The image forming apparatus according to claim 10, further comprising
an insulating member holding the second opening portion and the cable separately from each other.

* * * * *